July 1, 1969 J. A. HOFMANN 3,453,386
VIDEO SIGNAL NOISE CANCELLATION CIRCUIT
Filed Feb. 15, 1967
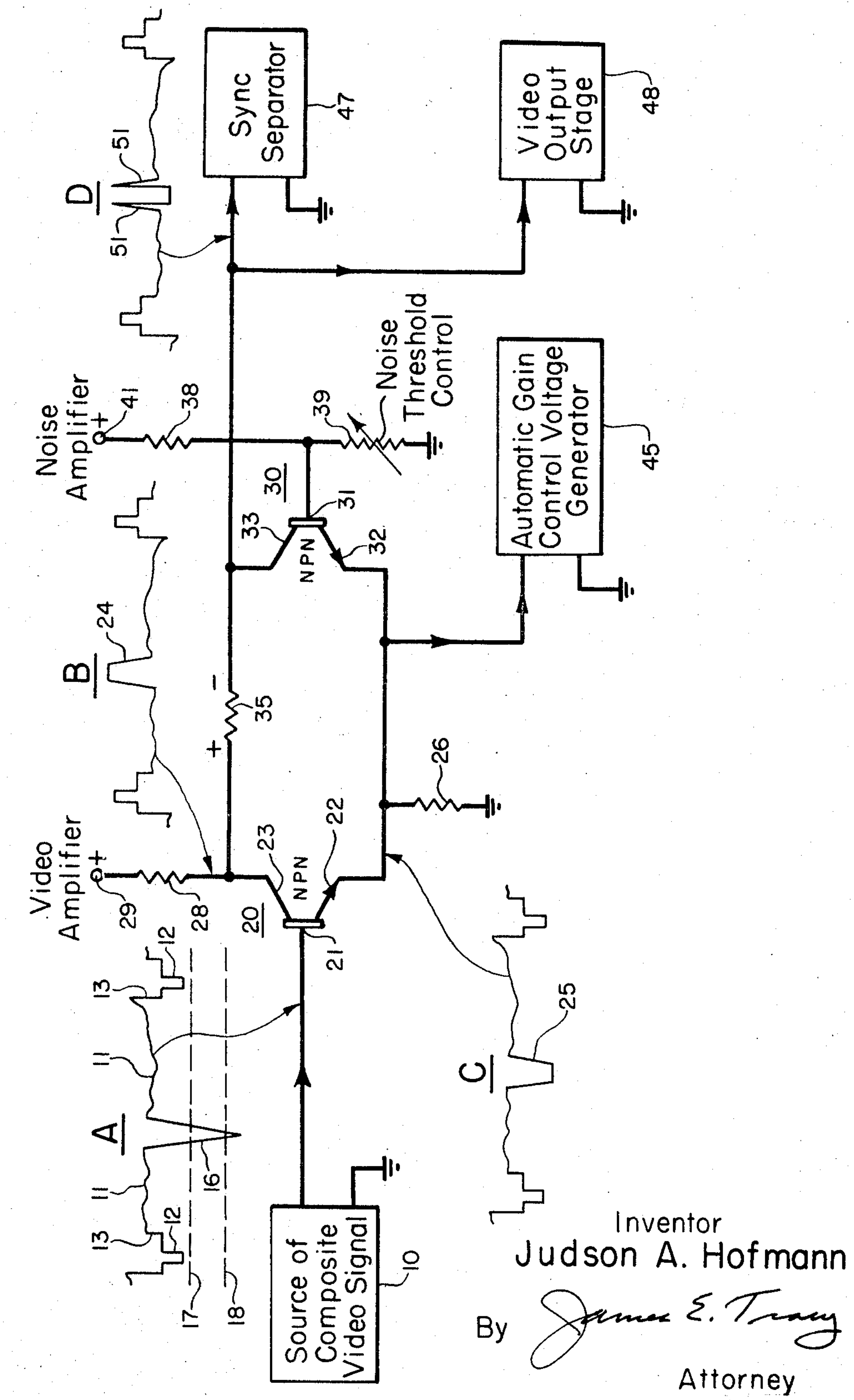
Inventor
Judson A. Hofmann
By James E. Tracy
Attorney United States Patent Office 3,453,386
Patented July 1, 1969

3,453,386

VIDEO SIGNAL NOISE CANCELLATION CIRCUIT

Judson A. Hofmann, Berwyn, Ill., assignor to Zenith Radio Corporation, Chicago, Ill., a corporation of Delaware Filed Feb. 15, 1967, Ser. No. 616,321
Int. Cl. H04n 5/60
U.S. Cl. 178—7.3 11 Claims

ABSTRACT OF THE DISCLOSURE

A video transistor amplifier develops opposed phases of an applied composite video signal containing undesired noise components. Noise cancellation of one of the phases is achieved in a matrix impedance to which is also applied a bucking signal of opposite polarity from the output of a normally cutoff noise transistor amplifier that is made operative in response to the noise components of the other phase.

This invention pertains to a novel circuit for removing unwanted noise components from a composite video signal in a television receiver.

Noise cancellation circuits have been developed in which noise pulses in a composite video signal are cancelled or balanced out by effectively adding to the video signal noise pulses of opposite phase or polarity. The noise-free composite video signal may then be applied to a synchronizing signal separator to derive the synchronizing components and to an AGC circuit for developing a gain control voltage having a magnitude determined by the amplitude of the synchronizing components, which amplitude represents the strength of the television signal received by the front end or RF turner of the television receiver. Removal or neutralizing of the noise pulses prior to sync separation and AGC renders those steps immune to the deleterious effects otherwise caused by the undesired noise. Of course, the sync separator and AGC circuit may each be made noise immune, such as by including noise operated gates in those stages. That approach, however, is not economical compared to the expedient of utilizing a single, common noise cancellation circuit which precedes both the separator and AGC voltage generator.

While the previously developed noise cancellation circuits realize economies over other arrangements for rendering the operation of a television receiver immune to noise, the circuit of the present invention achieves still further cost savings. Excellent noise cancellation is accomplished by an arrangement of relatively few circuit elements. Moreover, the arrangement may conveniently be reduced to an integrated circuit.

Accordingly, it is an object of the present invention to provide a new and improved video signal noise cancellation circuit for a television receiver.

It is another object of the invention to provide a simpified noise cancellation circuit, requiring few elements, and which lends itself to circuit integration.

A noise cancellation circuit, constructed in accordance with one aspect of the invention, comprises a source of a composite video signal having desired video and synchronizing components varying within a predetermined amplitude range but subject to the introduction of undesired noise components of an amplitude exceeding the range. There is a video amplifier including a first transistor having input, common and output terminals, a load impedance connected to the output terminal and a load impedance connected to the common terminal. Means are provided for supplying the composite video signal to the input terminal of the first transistor to develop opposed phases of the composite video signal at the output and common terminals of the first transistor. A matrix impedance is coupled to the output terminal of the first transistor to receive one of the phases. There is a noise amplifier which includes a normally cutoff second transistor having input, common and output terminals, and a connection from the output terminal to the matrix impedance. Means, including a connection from the common terminal of the first transistor to the input terminal of the second transistor, are provided for applying the other of the phases to the input of the second transistor to render that transistor operative only in response to the noise components having an amplitude exceeding a threshold level and to supply to the matrix impedance noise components of a polarity opposite to that of the noise components included in the one phase to effect noise cancellation of that one phase, thereby to develop at the output terminal of the second transistor an output signal containing the desired video and synchronizing components but having the undesired noise components substantially removed.

The features of this invention which are believed to be new are set forth with particularity in the appended claims. The invention, together iwth further objects and advantages thereof, may best be understood, however, by reference to the following description in conjunction with the accompanying drawing containing a schematic diagram of a video signal noise cancellation circuit, constructed in accordance with one embodiment of the invention, which may be incorporated in a television receiver.

Turning now to a description of the illustrated noise cancellation circuit, block 10 represents a source of a composite video signal, such as the video detector in a conventional television receiver. A typical composite video signal is shown in the drawing by voltage waveform A which appears at the upper output terminal of source 10 with respect to its lower terminal which is connected to a plane of reference potential such as ground. The illustrated composite video signal contains desired video components 11, horizontal synchronizing components 12 and blanking pedestal components 13, all of which vary within a predetermined amplitude range. The composite video signal is subject to the introduction of extraneous undesired noise components, such as that shown by noise pulse 16, of greater amplitude than the synchronizing components 12 and thus exceeding the amplitude range covered by the desired components. Dashed construction line 17, associated with waveform A, indicates a noise threshold level to be discussed.

As shown by waveform A, the polarity of the composite video signal is such that the sync pulses, and consequently the noise pulse, are negative going. In the illustrated embodiment, source 10 is constructed so that all of the desired components of the composite video signal are positive with respect to ground. For example, ground or zero voltage may be established at the level indicated by dashed construction line 18. Voltage waveform A is thus positive relative to ground except during the peak of noise pulse 16. Removal of noise components, in a manner to be explained, will be achieved regardless of their peak amplitude so long as that amplitude is sufficient to exceed the threshold level indicated by dashed line 17.

The video signal of waveform A is applied to a Class A operated video transistor amplifier which develops opposed phases of that signal. More particularly, the transistor 20 of the video amplifier is illustrated as of the bipolar type and of NPN gender. It is coupled in common emitter configuration; hence, the input terminal of the transistor 20 is connected to its base 21, the common terminal is connected to its emitter 22, and the output terminal of transistor 20 is connected to its collector 23. Base 21 is connected to the upper terminal of source 10 to receive the video signal; emitter 22 is connected to ground through a load impedance in the form of a single unbypassed resistor 26; and collector 23 is connected through a load impedance, which takes the form of a single resistor 28, to the positive terminal 29 of a source of D.C. operating potential the negative terminal of which is grounded.

Since there are load impedances connected to the output and common terminals of transistor 20, opposed phases of the composite video signal of waveform A are produced at those terminals as illustrated by voltage waveforms B and C. In a manner to be explained, a clipped version of noise pulse 16 manifests in each of waveforms B and C as shown by noise pulses 24 and 25. Negative-going noise components are thus developed at common terminal 22 while positive-going noise components are producted at output terminal 23.

A normally cutoff transistor noise amplifier is provided for amplifying the noise components in the video signal at emitter 22 to produce negative-going noise pulses to cancel or nullify the positive-going noise pulses in the video signal at collector 23, with the result that a noise-free composite video signal is developed at the output of the noise amplifier. Specifically, the transistor 30 of the noise amplifier is illustrated as of the bipolar type and of NPN gender, having a base 31, an emitter 32 and a collector 33. It is connected in common base configuration; thus, its input, common and output terminals are connected respectively to emitter 32, base 31 and collector 33.

Emitter 32 is directly tied to emitter 22 in order to supply the video signal to the input of transistor 30. A matrix impedance, which may comprise a single resistor 35, is connected between the output terminals of the two transistors, namely between collectors 23 and 33.

Transistor 30 is biased in its cutoff condition by means of a bias potential source coupled to its common terminal or base 31. To elucidate, a voltage divider comprising the series arrangement of a fixed resistor 38 and an adjustable resistor or potentiometer 39 is connected between ground and the positive terminal 41 of a source of D.C. operating potential, the negative terminal of which is grounded. The junction of resistors 38, 39 is connected to base 31 to reverse bias the base-emitter junction of transistor 30 when the composite video signal at emitter 32 is within its predetermined amplitude range. The bias may be varied by adjusting potentiometer 39, called the "noise threshold control" since it establishes the threshold level at which transistor 30 is rendered conductive and established in its amplifying or active mode of operation. As will be seen, control 39 is preferably set so that transistor 30 remains cut off except when a noise component in the composite video signal, devleoped at the output of source 10, exceeds the amplitude level indicated by dashed line 17. When transistor 30 is rendered operative in response to a noise component, its collector current flows through load resistor 28 and matrix resistor 35.

Emitter 22 is also connected to one input terminal of an automatic gain control voltage generator 45, whose other input terminal is grounded. Since resistor 26 is unbypassed, the video amplifier constitutes an emitter follower with respect to generator 45. Hence, emitter 22 effectively represents a relatively low impedance signal source for driving AGC generator 45. This is advantageous as it provides maximum efficiency and also flexibility in circuit design. An optimum impedance match may easily be established between the signal source and the input of generator 45. The AGC circuit may be of conventional construction and may be keyed or gated to examine the amplitude of the sync pulses of the composite video signal applied thereto and develop a voltage for controlling the gain of the television receiver. The output of generator 45 may be applied to the RF amplifier and to one or more of the IF amplifiers of the television receiver.

Collector 33 is also connected to an input terminal of a synchronizing signal separator 47 and also to an input terminal of a video output stage 48, the other input terminals of those units being grounded. Separator 47 may be of conventional construction for stripping the horizontal and vertical synchronizing pulses from an applied composite video signal so that they may be applied to the horizontal and vertical sweep systems of the receiver. Video output stage 48 constitutes another stage of video amplification, the output of which may be supplied to the input of the image reproducer or picture tube of the receiver.

In describing the operation of the noise cancellation circuit, it will initially be assumed that the composite video signal produced by source 10 contains no noise components. In other words, noise pulse 16 of voltage waveform A will be ignored. The entire signal will thus be positive with respect to the zero or ground reference level shown by dashed line 18, causing the base-emitter junction of transistor 20 to be forward biased in order that the video amplifier will function as a Class A amplifier. Because there are load impedances connected to both emitter 22 and collector 23, opposed phases of the composite video signal will be developed at the common and output terminals of transistor 20. Voltage waveform C (ignoring its noise pulse 25) is thus developed at common terminal 22 and this signal will be in phase with that of waveform A. The output signal at collector 23, however, will be in phase opposition to that of waveform C as shown by voltage waveform B, once again ignoring its noise pulse 24.

Since the base-emitter junction of transistor 30 is normally reverse biased to cut that transistor off, the composite video signal developed across load impedance 26 is essentially applied only to generator 45 wherein a voltage is developed for controlling the gain of the television receiver. Meanwhile, the composite video signal developed at output terminal 23 is supplied through matrix resistor 35 to the inputs of separator 47 and video output stage 48 to achieve synchronizing signal separation and to produce a video signal of a magnitude suitable for driving the picture tube.

Consideration will now be given to the operation of the described system in response to noise pulse 16. During Class A operation of the video amplifier, current flows in the direction from positive terminal 29, through load impedance 28, the collector-emitter path of transistor 20, and through load impedance 26 to ground. The current decreases in response to the leading edge of noise pulse 16 and this causes the voltage at emitter 22 to decrease, namely become less positive. When the instantaneous amplitude of the noise pulse reaches threshold level 17, the voltage at emitter 22 and consequently at emitter 32 will be negative with respect to that at base 31 with the result that the base-emitter junction of transistor 30 becomes forward biased to render that transistor operative and established in its active or amplifying mode of operation. It will remain operative throughout the interval in which noise component 16 exceeds threshold level 17 and during that time current flows in the direction from positive terminal 29, through resistors 28 and 35, and the collector-emitter path of transistor 30, and through resistor 26 to ground. Base current also flows from base 31 to emitter 32.

The peak amplitude of noise pulse 16 may be sufficient to drive transistor 30 into its saturated mode of operation but noise cancellation, in the manner to be explained, still results. Due to the nature of the transistor, regardless of whether it is in its amplifying or saturated mode, and the associated circuit parameters when transistor 30 is operative resistor 26 is essentially shorted out (by the low impedance presented by emitter 32) so that the impedance between emitter 22 and ground drops to substantially zero. In other words, transistor 30 sufficiently loads resistor 26 so that substantially no voltage can be developed thereacross. This has the effect of clipping the noise pulse as it appears in the composite video signal produced at emitter 22, as is shown by noise pulse 25 which is a clipped version of noise pulse 16.

Since the noise clipped video signal is supplied to generator 45, the operation of the AGC circuitry is made substantially noise immune. Even though only a small portion of the composite signal (namely only the sync pulses) is employed to develop the AGC voltage, noise pulses may coincide with the sync pulses and in the absence of noise clipping a false AGC voltage would result.

The noise components are also clipped in the phase of the composite video signal developed at collector 23, as indicated by noise pulse 24 in waveform B. This occurs because the current in load resistor 28 is substantially constant throughout the interval in which transistor 30 is conductive. To explain, the collector current of transistor 20, which flows in resistor 28, tends to decrease in response to the leading edge of the negative going noise pulse 16 in the composite signal applied to base 21. However, at the instant transistor 30 becomes operative its collector current, which flows in resistors 28 and 35, tends to increase. By an appropriate selection of circuit elements, the amount by which the collector current of transistor 30 increases may be made to match the amount by which the collector current of transistor 20 decreases, with a net result that constant current flows in resistor 28 while transistor 30 is conductive thereby to effect clipping.

Neutralization of noise pulse 24 is achieved in matrix impedance 35. Transistor 30 applies to resistor 35 a noise component of a polarity opposite to that of noise component 24 to effect noise cancellation and develop at output terminal or collector 33 of transistor 30 the output signal (shown by voltage waveform D) which contains the desired video and synchronizing components but has the undesired noise components substantially removed.

To explain further, the collector current of transistor 30 flows through matrix resistor 35 toward collector 33 to produce a voltage pulse across the resistor with the polarity indicated. Thus, a negative-going pulse is effectively added to the positive-going pulse 24 as the composite video signal of waveform B is translated to collector 33. Stated differently, the amplitude of the noise cancelling voltage developed across resistor 35 is effectively subtracted from the amplitude of noise pulse 24. As shown by the output signal of waveform D, noise pulse 24 has actually been cancelled and depressed to a level well within the amplitude range of the video components. Of course, by selection of circuit components the noise pulses may be reduced to any desired level. The two spikes 51 of waveform D are produced in response to the leading and trailing edges of noise pulse 16 which occur prior and subsequent to conduction of transistor 30.

The composite video signal applied to the input of sync separator 47 is therefore substantially noise-free. As a consequence, the operation of the separator will be unaffected by the noise components originally present in the composite video signal produced by source 10. Spikes 51 represent relatively high frequency components and the frequency response of separator 47 may easily be limited in order that the separator will not respond to those spikes.

The noise-free video signal of waveform D is also applied to video output stage 48. At times, it is advantageous to supply a noise-cancelled video signal to the picture tube. For example, in one form of subscription television the video components are modulated on its RF carrier with black and white inverted so that a negative picture (which may be likened to a photographic negative) is produced on the picture tube screen of a non-subscriber's receiver. In other words, white picture information is represented by a video component established at the blanking level. In conventional television transmission, black picture information is established at the level of the blanking pedestals. Since the undesired noise components always extend in the direction of the sync pulses, in the described subscription television system the noise pulses will therefore represent white noise and cause "blooming" on the picture tube screen of a subscriber's receiver even though the subscription television signal is being properly decoded. It is, therefore, important in a subscription system of that type to eliminate the noise components in the video signal before application to the picture tube. The noise cancellation circuit of the present invention may conveniently be employed for that purpose.

Of course, if the noise cancellation circuit is incorporated in a conventional television receiver and there is no particular reason to drive the picture tube with a noise-free video signal, the input of video output stage 48 may be connected to emitter 22 in order that it may be driven from a low impedance source. If desired, resistor 26 may be a potentiometer the adjustable tap of which is connected to the input of the video stage. In such an arrangement, the potentiometer serves as a contrast control.

It will be appreciated that driving the noise amplifier from emitter 22 achieves not only circuit simplification but provides current gain (by means of transistor 20) to the noise pulses before application to the noise amplifier. Thus, there are effectively two stages of noise amplification—current gain in the video amplifier and voltage gain in the noise amplifier.

While transistors 20 and 30 have been described as of the bipolar type, other transistor types may be employed. In fact, transistors of unipolar type, such as field effect transistors, may even be utilized to serve the functions of transistors 20 and 30.

The invention provides, therefore, a simplified and inexpensive circuit arrangement for nullifying or neutralizing the unwanted noise components in a composite video signal. The makeup of the noise cancellation arrangement is such that it may conveniently be reduced to an integrated circuit.

While a particular embodiment of the invention has been shown and described, modifications may be made, and it is intended in the appended claims to cover all such modifications as may fall within the true spirit and scope of the invention.

I claim:

1. A video signal noise cancellation circuit for a television receiver comprising:

a source of a composite video signal having desired video and synchronizing components varying within a predetermined amplitude range but subject to the introduction of undesired noise components of an amplitude exceeding said range;

a video amplifier including a first transistor having input, common and output terminals, a load impedance connected to the output terminal and a load impedance connected to the common terminal;

means for supplying said composite video signal to the input terminal of said first transistor to develop opposed phases of said composite video signal at the output and common terminals of said first transistor;

a matrix impedance coupled to the output terminal of said first transistor to receive one of said phases;

a noise amplifier including a normally cutoff second transistor having input, common and output terminals, and a connection from the output terminal to said matrix impedance;

and means, including a connection from the common terminal of said first transistor to the input terminal of said second transistor, for applying the other of said phases to the input of said second transistor to render that transistor operative only in response to the noise components having an amplitude exceeding a threshold level and to supply to said matrix impedance noise components of a polarity opposite to that of the noise components included in said one phase to effect noise cancellation of said one phase, thereby to develop at the output terminal of said second transistor an output signal containing the desired video and synchronizing components but having the undesired noise components substantially removed.

2. A video signal noise cancellation circuit according to claim 1 in which said matrix impedance is a resistor connected between the output terminals of said transistors.

3. A video signal noise cancellation circuit according to claim 1 in which said second transistor is established in its cutoff condition by a bias potential source coupled to its common terminal.

4. A video signal noise cancellation circuit according to claim 1 in which said second transistor has amplifying and saturated modes of operation, in addition to its cutoff mode, and in which noise components exceeding the threshold level establish said second transistor at least in its amplifying mode.

5. A video signal noise cancellation circuit according to claim 1 in which the load impedance connected to the common terminal of said first transistor is sufficiently loaded by said second transistor, when said second transistor is operative, to effect clipping at the threshold level of the noise components included in said other phase of said composite video signal.

6. A video signal noise cancellation circuit according to claim 1 in which said second transistor when operative supplies a compensating signal to the load impedance connected to the output terminal of said first transistor to maintain substantially constant current flow in that load impedance to effect clipping at the threshold level of the noise components included in said one phase of said composite video signal.

7. A television receiver including a video signal noise cancellation circuit according to claim 1 and also including means connected to the common terminal of said first transistor for utilizing said other phase of said composite video signal, the common terminal of said first transistor effectively representing a relatively low impedance signal source for driving said utilizing means.

8. A television receiver including a video signal noise cancellation circuit according to claim 1 and also including an automatic gain control voltage generator connected to the common terminal of said first transistor for receiving said other phase of said composite signal.

9. A video signal noise cancellation circuit according to claim 1 in which said load impedances and said matrix impedance are resistances.

10. A video signal noise cancellation circuit according to claim 1 in which said first and second transistors are of the same gender and each having a base, an emitter and a collector; wherein said first transistor is coupled in common emitter configuration with its input, common and output terminals connected respectively to its base, emitter and collector; and in which said second transistor is coupled in common base configuration with its input, common and output terminals connected respectively to its emitter, base and collector.

11. A video signal noise cancellation circuit according to claim 10 in which said opposed phases, appearing at the emitter and collector of said first transistor, are voltage signals each containing at least a substantial portion of the noise components included in the composite video signal produced by said source; in which said load impedances are resistors; wherein said matrix impedance is a resistor connected between the collectors of said transistors; in which the emitters of said transistors are directly connected together to supply said other phase, and the noise components included therein, to said second transistor; and wherein said second transistor translates current through said matrix resistor to develop thereacross a noise cancelling voltage that is effectively subtracted from the noise components included in said one phase thereby to develop said output signal at the collector of said second transistor.

References Cited

UNITED STATES PATENTS 3,182,122 5/1965 Lin Kao ............ 178—7.3

RICHARD MURRAY, *Primary Examiner.*

R. L. RICHARDSON, *Assistant Examiner.*